C. P. HOCKETT.
AUTOMOBILE SIGNAL.
APPLICATION FILED NOV. 19, 1917.

1,332,258.

Patented Mar. 2, 1920.

INVENTOR
Charles P. Hockett

WITNESSES
W. C. Fielding
Ross J. Woodward

BY Richard Owen
ATTORNEY

UNITED STATES PATENT OFFICE.

CHARLES P. HOCKETT, OF VINITA, OKLAHOMA.

AUTOMOBILE-SIGNAL.

1,332,258.  Specification of Letters Patent.  Patented Mar. 2, 1920.

Application filed November 19, 1917. Serial No. 202,829.

*To all whom it may concern:*

Be it known that I, CHARLES P. HOCKETT, a citizen of the United States, residing at Vinita, in the county of Craig and State of Oklahoma, have invented certain new and useful Improvements in Automobile-Signals, of which the following is a specification.

This invention relates to an improved automobile signal and the principal object of the invention is to provide a signal so constructed and mounted that the direction in which the automobile is to turn may be indicated through the medium of a signal arm pivotally mounted and swung in the direction in which a turn is to be made.

Another object of the invention is to so construct this signal that it may be illuminated thus permitting it to be seen at night.

Another object of the invention is to provide improved means for pivotally mounting the signal and improved means for turning the signal.

Another object of the invention is to so construct this signal that it will be simple in construction and consist of a comparatively few number of parts easy to assemble and not liable to get out of order.

This invention is illustrated in the accompanying drawings, wherein:—

Figure 1:
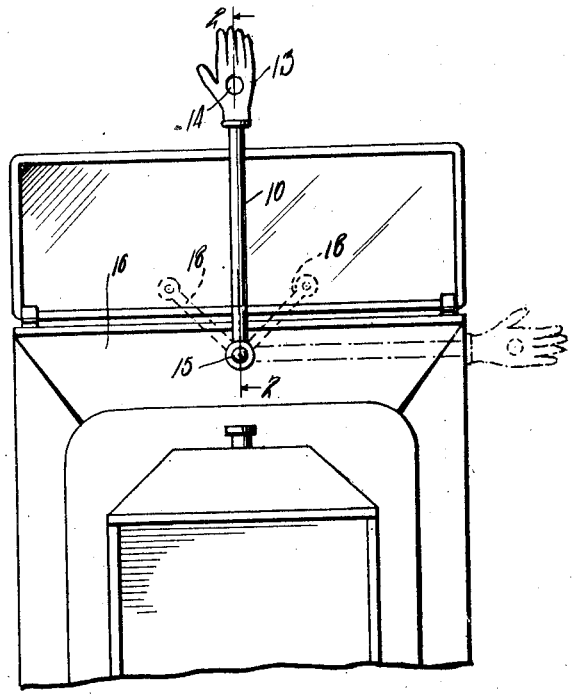
Figure 1 is a view in front elevation showing the signal connected with a portion of an automobile.

The signal arm 10 will be hollow throughout the greater portion of its length to provide a conduit for the power wires 11 which power wires will be connected with the lamp 12 mounted in the signal hand 13, screwed or otherwise detachably connected with the upper portion of the signal arm and provided with an opening 14 through which the lamp may show when illuminated. This signal arm is rigid upon the outer end of a shaft 15 journaled through the dash-board 16 of the automobile and it will be readily seen that when this shaft is rotated, the signal arm will be swung to one side as indicated by the dotted line position in Fig. 1. This shaft extends through the dash-board and carries an actuating lever indicated in general by the numeral 17. This lever is of V-shape, having two arms 18 extending upon opposite sides of the signal arm 10 as shown in Fig. 1.

Figure 2:
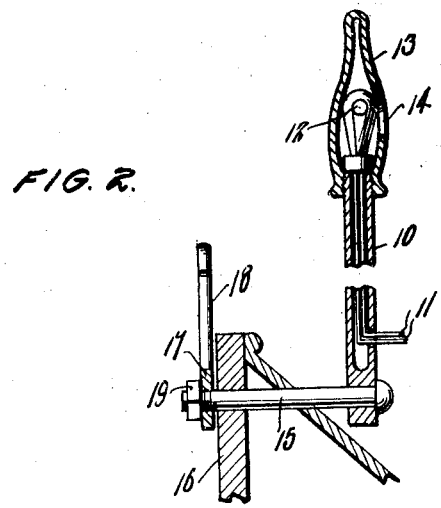
Fig. 2 is a vertical sectional view through the signal and a fragment of the automobile taken along the line 2—2 of Fig. 1.

When this signal is in use, it will be mounted upon the dash-board of the automobile as shown in Figs. 1 and 2 and in its normal or neutral position will extend vertically. When it is desired to turn in one direction, the signal arm will be swung in the direction in which the turn is to be made through proper manipulation of the lever 17. That is to say, the handle on either of its arms 18 may be grasped and moved inward until the lever arm stands upright, and at this time the signal arm 10 will have been swung to an oblique position; or if the lever arm is moved from one oblique position past the center over to the other oblique position, the lever arm will have been swung from a vertical down to a horizontal, and thereby the operator knows how far to move the lever arm in order to give the signal arm an appropriate swing. As this lever is held rigid upon the shaft or pin 15 by the securing nut, 19, the shaft will be rotated and the signal arm swung in the proper direction. After the turn has been made, the signal arm will be returned to the neutral position. If desired, a suitable switch could be provided for controlling the lighting of the lamp 12 and therefore the lamp would only be lighted when the signal is to be operated. The lamp could be illuminated with the signal in the neutral position and this would indicate that the machine is to be brought to a stop thus warning machines in the rear.

It will be noted that the elongated arms extend at right angles to each other, and extend to considerable distances to each side of the perpendicular or the manner in which the arm 10 is normally carried and has the handles 18 at their extremities. When the operator is about to steer the machine in a certain direction he need not concentrate his thought on the necessary way to operate the signal but may continue to think of the manner to steer the machine in order to avoid obstacles or to properly operate the engine for almost mechanically he can reach forward and strike the arm slanting in the direction he is about to turn and thus the signal arm will be swung in the proper direction.

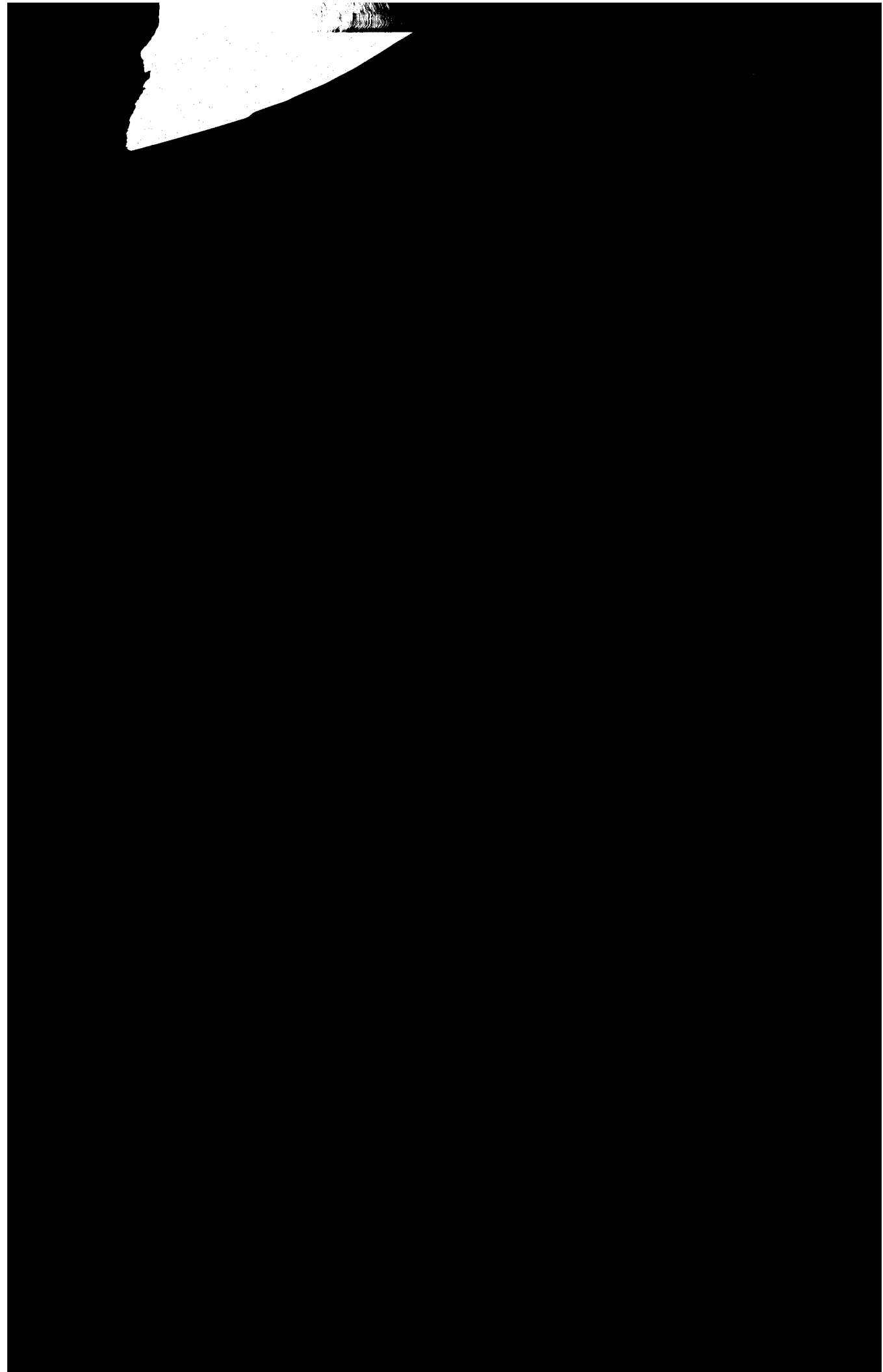

What is claimed is:—

In a direction indicator for automobiles,